UNITED STATES PATENT OFFICE.

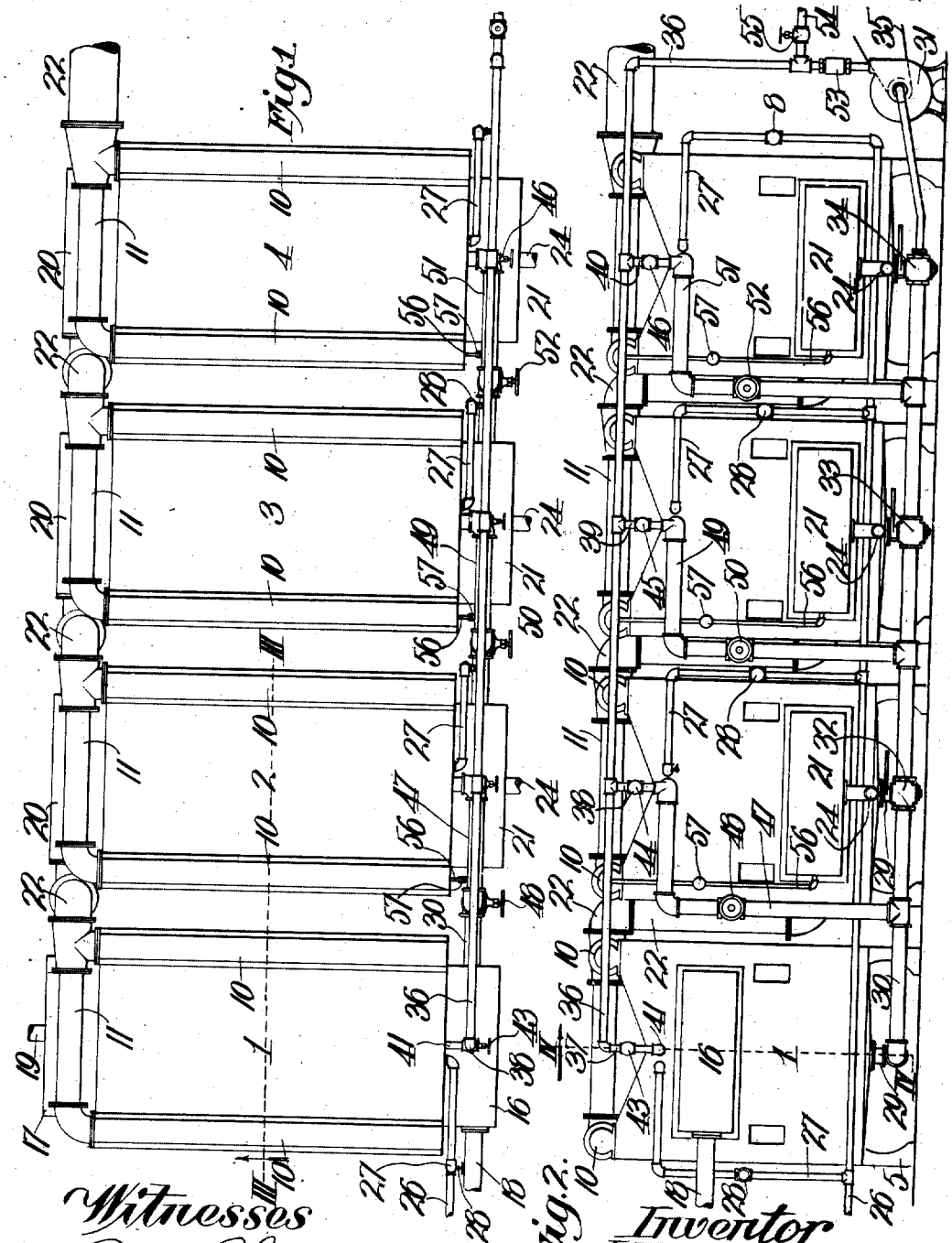

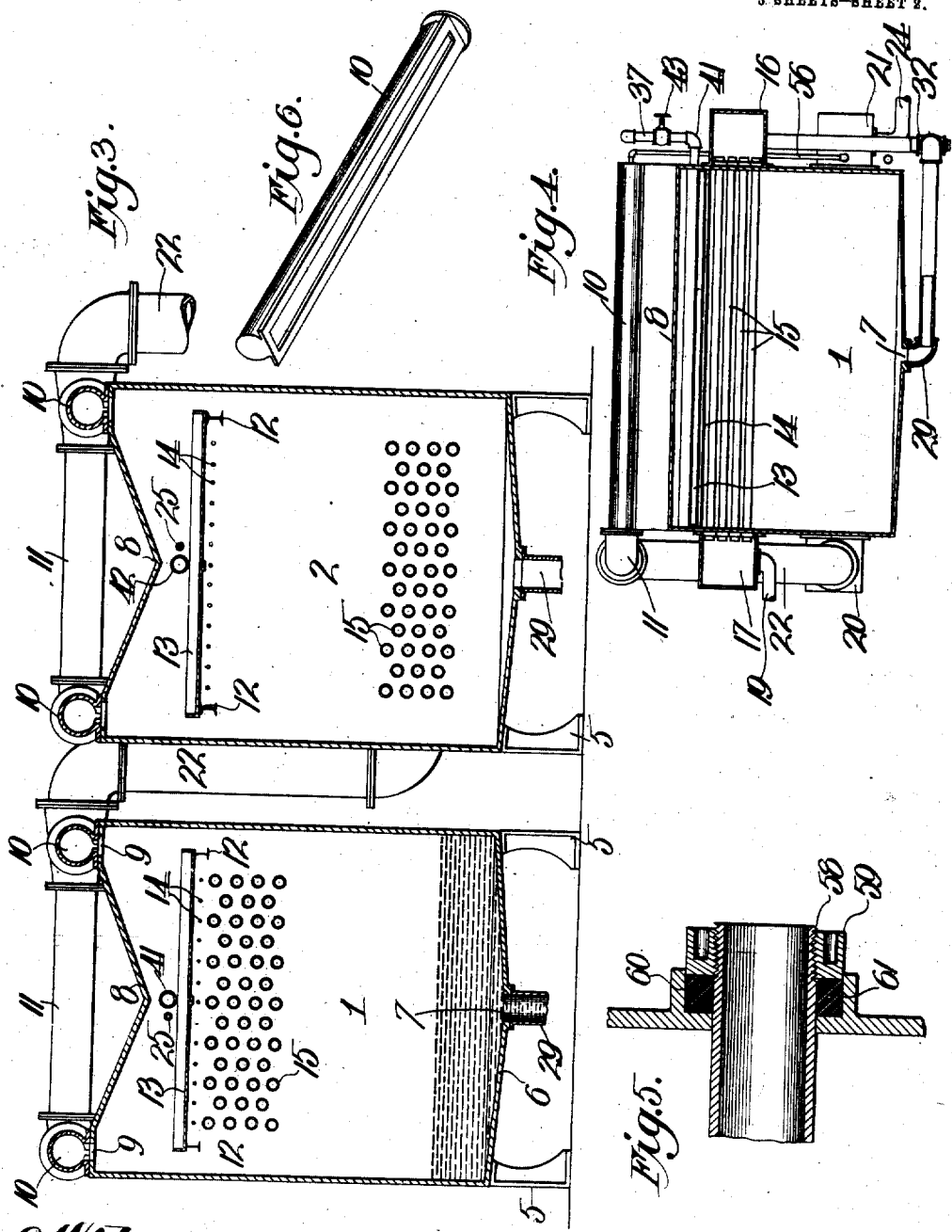

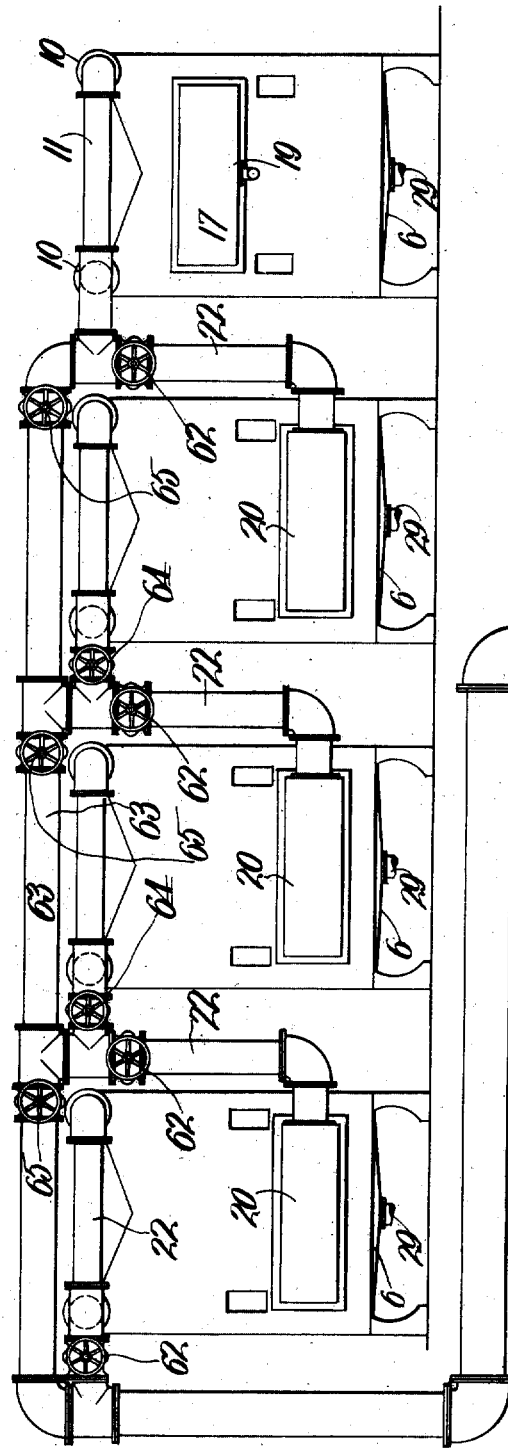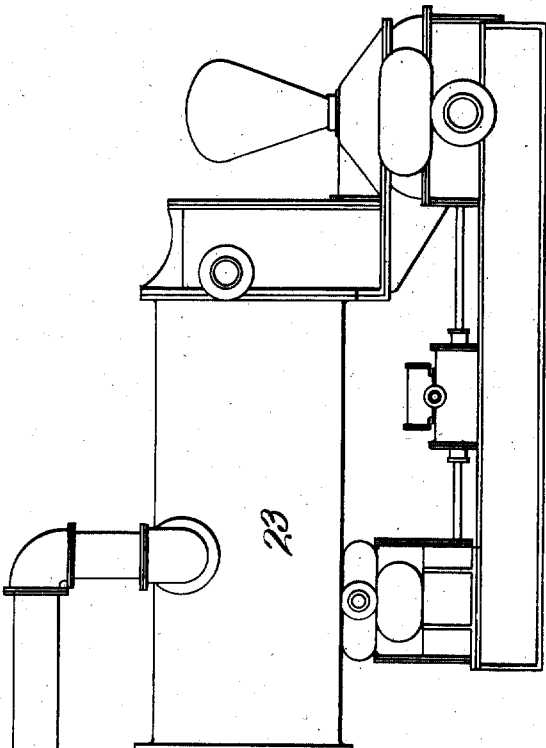
Fig. 7.

JOHN E. KAUFFMAN, OF KANSAS CITY, KANSAS.

EVAPORATING APPARATUS.

990,878.　　　　　Specification of Letters Patent.　　Patented May 2, 1911.

Application filed September 3, 1910.　Serial No. 580,443.

*To all whom it may concern:*

Be it known that I, JOHN E. KAUFFMAN, a citizen of the United States, residing at Kansas City, in the county of Wyandotte and State of Kansas, have invented certain new and useful Improvements in Evaporating Apparatus, of which the following is a specification.

This invention relates to evaporating apparatus of that character known as multiple-effect apparatus, for producing glue, stick, beef extract, sugar, etc., and has for its object the production of multiple-effect evaporating apparatus, which will perform its function efficiently and expeditiously and evolve a product of the best quality.

With this general object in view, the invention consists in certain novel and peculiar features of construction and organization as hereinafter described and claimed; and in order that it may be fully understood reference is to be had to the accompanying drawings, in which—

Figure 1, is a plan view of a multiple effect evaporating apparatus embodying my invention. Fig. 2, is a front view of the same. Fig. 3, is an enlarged vertical section on the line III—III of Fig. 1. Fig. 4, is a vertical section on the line IV—IV of Fig. 2. Fig. 5, is an enlarged section showing the preferred method of securing the tubes in position. Fig. 6, is a detail perspective view of one of the headers forming a part of the apparatus. Fig. 7, is a rear view of a modified form of the apparatus.

Before proceeding with the detailed description of the apparatus, it is desirable to state that my experience has shown that if the liquid from which the glue is produced, is overheated, the glue will be of inferior quality, and to reduce the chances of overheating the liquid, I subject it but once—in the first effect—to the heat produced by live steam, and thereafter utilize the vapor produced in one effect to heat the liquid as it passes through the next effect, and in order that the vapor in each effect shall have an evaporating function, all of the effects except the first one are so constructed that the liquid in passing through them is reduced to a lower temperature than the vapor passing through the tubes thereof.

Referring now to the drawings, 1, 2, 3, and 4 represent what are generally termed the pans of a multiple-effect evaporating apparatus, each being preferably supported on legs 5, and provided with bottoms 6, which taper downward to openings 7 formed therein. Each effect is also provided with a V-shaped top 8, and at opposite sides of the V-shaped top with vapor-exit passages 9, communicating with headers 10 connected at one end by a transverse header 11. Each effect is also preferably provided internally with bars 12 as a support for a perforated shallow vessel 13, wires 14 underlying the perforations of the vessels in order to subdivide and therefore more widely distribute or spray the liquid as it falls from said vessels upon the tubes 15 extending longitudinally through the pans, the tubes 15 of the first effect being arranged close to the spraying vessel and the tubes in the remaining effects near the bottoms thereof. By this arrangement the liquid falling on the tubes of the first effect is heated and cools slightly in falling from said tubes to the bottom of the pan, the contact of the liquid with the tubes resulting in the production of vapor in the first effect. In the remaining effects the liquid falls a considerable distance before it comes in contact with the tubes thereof so that at such time it shall be at a lower temperature than the vapor produced in the first effect passing through such tubes that the heat from the latter may have a vaporizing effect on said cooled liquid, it being understood that by reducing the temperature of the liquid in each effect before it contacts with the tubes thereof, it condenses the vapor in such tubes and therefore tends to create a vacuum therein to pull the vapor from the preceding effect.

16 and 17 are steam chests secured to the front and rear ends respectively of the first effect or pan and communicating with tubes 15 thereof, and 18 a steam supply pipe connected to chest 16, 19 indicating an exhaust pipe connected to steam chest 17 for the escape of the water of condensation in tubes 15. The remaining effects are provided with similar steam chests 20 and 21, the former at the rear ends of the effects or pans and each connected by a pipe 22 to the headers of the preceding effect or pan, as shown most clearly in Figs. 1 and 3, the pipe 22 of the fourth or last effect leading to a condenser 23 or suction pump, not shown, whereby a vacuum may be produced in the four effects or pans, the strength of the vacuum being greatest in the fourth effect and of least strength in the first effect or pan. The steam chests 21 have exhaust pipes 24 for the escape of the water of condensation from the tubes of the corresponding effects, it being understood that a suction pump, not shown, or its equivalent is connected to exhaust pipes 19 and 24 to effect the withdrawal of water of condensation, therethrough.

25 are perforated pipes extending through the effects or pans above the vessels 13 to supply the latter with liquid from which the glue or other product is to be evolved.

26 is a liquid supply pipe connected by branch pipes 27 to pipes 25, the branch pipes being equipped with controlling valves 28.

29 are discharge pipes, depending from the bottoms of the pans or effects to receive the liquid which passes off through the openings 7.

30 is a pipe connected at one end to the discharge pipe 29, of the first effect or pan, and at its opposite end to a rotary pump 31, and mounted on said pipe are similar three-way valves 32, 33 and 34, the first connecting pipe 30 with the discharge pipe 29 of the second pan or effect, the second connecting pipe 30 with the discharge pipe 29 of the third pan or effect, and the third connecting pipe 30 with the discharge pipe 29 of the fourth pan or effect. The pump 31 is adapted to be driven by a belt 35 connected to a counter shaft or motor, not shown, and leading from the pump is a circulating pipe 36 having branch pipes 37, 38, 39, and 40, the branch pipe 37 communicating with the short pipe 41 arranged to discharge into the vessel 13 of the first effect, the remaining branch pipes communicating with the corresponding pipes 42 of the remaining effects, and the pipes 37 to 40 inclusive, are provided with controlling valves 43, 44, 45, and 46 respectively. The pipe 38 is connected by pipe 47 to pipe 30 forward of valve 32 and is equipped with a controlling valve 48. Pipe 39 is connected by a pipe 49 with pipe 30 between valves 32 and 33 and is provided with a controlling valve 50, and pipe 40 is connected by a pipe 51 with pipe 30 between valves 33 and 34, and is equipped with a controlling valve 52. The circulating pipe 36 is provided with a check valve 53, and a discharge pipe 54 equipped with a controlling valve 55 and each chest 21 is connected by a pipe 56 with one of the headers 10 of the corresponding pan or effect, said pipes being controlled by valves 57.

The preferred method of securing the tubes to the end walls of the pans or effects is to provide said tubes with external threads 58 at their ends to receive nuts 59, susceptible of moving into sockets 60 and against a suitable packing 61 occupying said sockets and establishing air-tight joints between the tubes and the walls of the effects.

In operation a vacuum is first created in the effects, preferably by the pull of the condenser or a vacuum pump (not shown) hereinbefore mentioned, the vacuum in the tubes being obtained by the pipes 56 connecting a chest of each effect with one of the headers of the same and acting as ventilators for the tubes. Having obtained the vacuum, the valve 28 of the liquid supply pipe is opened to permit the liquid to pass from pipe 26 through pipe 27 into pipe 25, thence into vessel 13, from which it is sprayed downward over the steam tubes 15 of the first effect. At the same time steam is permitted to enter chest 16, and pass into said tubes 15 where it is condensed, the water of condensation passing to the rear chest and escaping thence through pipe 19 to the atmosphere or wherever desired. This steam heats the tubes to vaporizing temperature and thus produces a vaporizing effect on the liquid sprayed downward over them, which vapor under the influence of the vacuum rises through the headers 10 and 11 of the first effect and through pipe 22 into the chest 20 of the second effect, and into the tubes 15 of the second effect where it is condensed, the water passing into the chest 21 and escaping thence to the atmosphere through pipe 24, this vapor heating the said tubes 15 of the second effect. The vaporization of the liquid in the first effect reduces the vacuum thereof so that the liquid remaining is drawn by the vacuum in the second effect up through pipes 30 and 47 into pipe 42, from which it passes into the vessel 13 of the second effect and is sprayed downward thereby, it being understood that at this time valve 28 of branch supply pipe 27 of the second effect is closed, and that the three-way valve 32 is adjusted to close communication between pipe 29 of the second effect and part of pipe 30 in front of the valve. By the time the liquid sprayed in the second effect reaches the tubes 15, of said effect, its temperature is reduced below that of the vapor passing from the first effect through said tubes, and is therefore acted upon by the latter with a vaporizing effect, the vapor in the said tubes being condensed by the contact of the liquid with said tubes and the water of condensation passing to the suction pump. The vaporizing action in this effect reduces the vacuum therein and the vapor produced passes as it did from the first effect, into the tubes of the third effect and is condensed and withdrawn by the pump, the liquid from the second effect passing through pipe 29, thereof, the three-way valve 32 and pipes 30 and 49 into pipe 42 of the third effect, the valve 28 of the branch pipe 27 of the third effect being closed at this time, the three-way valve 33 occupying an adjustment which cuts off communication between pipe

29 of the third effect and that part of pipe 30 in front of the said valve. The action in the third effect is the same as the second and the same is true of the action in the fourth effect, it being noted that the vapor produced in the first, second and third effects respectively is utilized to vaporize the liquid passing through the second, third and fourth effects respectively, and that with each vaporizing action the liquid becomes heavier and denser, it being understood that the operation described continues until the liquid is reduced to the required density, the liquid from the fourth effect being carried back to the first effect through pipe 36. If it is desired to thin the liquid at any time, in any particular effect, the proper valve 28 of the branch supply pipe 27 of such effect is opened in order that fresh liquid from the pipe 26 may pass through said pipe 27 and enter the corresponding effect.

Each pipe 22 is provided with a controlling valve 62, and the pipes 22 leading from the first effect to the second effect, from the second to the third effect, and from the third to the fourth effect, are connected forward of their respective valves 62 to a pipe 63 leading to the condenser 23, and forward of the points of connection of the pipes 22 leading from the second to the third and from the third to the fourth effect, with the pipe 63, and controlling valve 64, the last-named pipe being also equipped with a controlling valve 65 between the condenser and each pipe 22.

By means of the valves 62 the vacuum can be so controlled that the vacuum in the effect forward of the valve can be reduced and increased in the effect rearward of the valve, the principal object of the provision of means for varying the strength of the vacuum being to accommodate the apparatus when running light liquid through certain effects and heavier liquid through the others as it is possible to do by proper manipulation of the valves.

From the above description it will be apparent that I have produced an evaporating apparatus possessing the features of advantage enumerated as desirable and I wish it to be understood that I do not desire to be restricted to the exact details of construction shown and described as obvious modifications will suggest themselves to one skilled in the art.

I claim:—

1. An evaporating apparatus, comprising a plurality of effects consisting of pans, steam chests at opposite ends thereof, tubes extending through the pans from one chest thereof to the other, headers communicating with the upper portions of the pans, pipes connecting the headers of each of the pans except the last one with one of the chests of the next pan to the rear, a steam supply pipe connected to one of the chests of the first pan, exhaust pipes connected to the other chest of the first pan and the rear chests of the remaining pans, a valve-controlled liquid-supply pipe for the first pan, a perforated vessel arranged in said pan above and close to the said tubes thereof to receive and discharge the liquid downward over said tubes, perforated vessels arranged in the remaining pans above and remote from the tubes thereof, pipes connecting the bottoms of all of the pans except the last one to the next pan to the rear, above the perforated vessels thereof, a pump connected to the bottom of the last pan, a circulating pipe leading from the pump to one of the pans above the perforated vessel thereof, and a valve controlled discharge pipe for the pump.

2. An evaporating apparatus, comprising a plurality of effects consisting of pans, steam chests at opposite ends thereof, tubes extending through the pans from one chest thereof to the other, headers communicating with the upper portions of the pans, pipes connecting the headers of each of the pans except the last one, with one of the chests of the next pan to the rear, a steam supply pipe connected to one of the chests of the first pan, exhaust pipes connected to the other chest of the first pan and the rear chests of the remaining pans, a valve-controlled liquid supply pipe for the first pan, a perforated vessel arranged in said pan above and close to the said tubes thereof to receive and discharge the liquid downward over said tubes, perforated vessels arranged in the remaining pans above and remote from the tubes thereof, pipes connecting the bottoms of all of the pans except the last to the next pan to the rear, above the perforated vessels thereof, a pump connected to the bottom of the last pan, a circulating pipe leading from the pump to all of the pans above the perforated vessels thereof, a valve controlling communication between said circulating pipe and each pan, and a valve controlled discharge pipe for the pump.

3. An evaporating apparatus, comprising a plurality of effects consisting of pans, steam chests at opposite ends thereof, tubes extending through the pans from one chest thereof to the other, headers communicating with the upper portions of the pans, pipes connecting the headers of each of the pans except the last one with one of the chests of the next pan to the rear, a steam supply pipe connected to one of the chests of the first pan, exhaust pipes connected to the other chest of the first pan and the rear chests of the remaining pans, a valve-controlled liquid supply pipe for the first pan, a perforated vessel arranged in said pan above and close to the said tubes thereof to receive and discharge the liquid downward over said tubes, perforated vessels arranged in the remaining pans above and remote from the tubes thereof, a pump, a pipe connecting the bottom of the first pan with the pump, pipes connecting the bottoms of the remaining pans with the said pipe, valves at the junction points of the said branch pipes with the pipe leading to the said pump and each susceptible of either closing communication between its respective branch pipes and the other pipe or of closing communication between the pump and the pans ahead of the particular valve, valve-controlled pipes communicating with all of the pans except the first one, above their perforated vessels and with the said pipe leading to the pump at points ahead of the valves of the said branch pipes of the said remaining pans, a circulating pipe leading from the pump to all of the pans above the perforated vessels thereof, a valve controlling communication between said circulating pipe and each pan, and a valve controlled discharge pipe for said pump.

4. An evaporating apparatus, comprising a plurality of effects consisting of pans, steam chests at opposite ends thereof, tubes extending through the pans from one chest thereof to the other, headers communicating with the upper portions of the pans, pipes connecting the header of each of the pans except the last one with one of the chests of the next pan to the rear, a steam supply pipe connected to one of the chests of the first pan, exhaust pipes connected to the other chest of the first pan and the rear chests of the remaining pans, a valve-controlled liquid supply pipe for the first pan, a perforated vessel arranged in said pan above and close to the said tubes thereof to receive and discharge the liquid downward over said tubes, perforated vessels arranged in the remaining pans above and remote from the tubes thereof, pipes connecting the bottoms of all of the pans except the last one to the next pan to the rear above the perforated vessels thereof, a pump connected to the bottom of the last pan, a circulating pipe leading from the pump to one of the pans above the perforated vessel thereof, a valve-controlled discharge pipe for the pump, a condenser, a pipe connecting the headers of all of the pans with the condenser, a valve controlling said pipe rearward of each pan except the last, a valve controlling each header except the first one between its respective pan and said pipe, and a valve controlling each pipe connecting the header of one with a chest of the adjacent one.

5. An evaporating apparatus, comprising a plurality of effects consisting of pans, steam chests at opposite ends thereof, tubes extending through the pans from one chest thereof to the other, headers communicating with the upper portions of the pans, pipes connecting the header of each of the pans except the last one with one of the chests of the next pan to the rear, a steam supply pipe connected to one of the chests of the first pan, exhaust pipes connected to the other chest of the first pan and the rear chests of the remaining pans, a valve controlled liquid supply pipe for the first pan, a perforated vessel arranged in said pan above and close to the said tubes thereof to receive and discharge the liquid downward over said tubes, perforated vessels arranged in the remaining pans above and remote from the tubes thereof, a pump, a pipe connecting the bottom of the first pan with the pump, branch pipes connecting the remaining pans with said pipe, valves at the junction points of the said branch pipes with the pipe leading to the said pump and each susceptible of either closing communication between its respective branch pipe and the other pipe or closing communication between the pump and the pans ahead of the particular valve, valve-controlled pipes communicating with all of the pans except the first one above their perforated vessels and with the said pipe leading to the pump at points ahead of the valves of the said branch pipes of the said remaining pans, a circulating pipe leading from the pump to all of the pans above the perforated vessels thereof, a valve controlling communication between said circulating pipe and each pan, a valve controlled discharge pipe for said pump, and a valve-controlled pipe connecting the liquid supply pipe with each pan above the perforated vessel thereof.

In testimony whereof I affix my signature, in the presence of two witnesses.

JOHN E. KAUFFMAN.

Witnesses:
HELEN C. RODGERS,
G. Y. THORPE.

---

Copies of this patent may be obtained for five cents each, by addressing the "Commissioner of Patents, Washington, D. C."